United States Patent [19]

Adams

[11] 4,231,185

[45] Nov. 4, 1980

[54] FOLIAGE GUIDE

[76] Inventor: Jerry Adams, 2003 Waterloo Rd. A-12, Cedar Fall, Iowa 50613

[21] Appl. No.: 945,204

[22] Filed: Sep. 25, 1978

[51] Int. Cl.³ .............................. A01G 3/08; A01G 5/00
[52] U.S. Cl. .......................................... 47/1 R; 83/29; 211/49 R; 269/53; 294/1 R
[58] Field of Search ............. 47/1 R; 144/2 Z, 288 R; 269/1, 40, 53, 54.5, 54.4; 211/49 R, 59.1; 294/5.5, 1 R; 83/29

[56] References Cited

U.S. PATENT DOCUMENTS

| 851,112 | 4/1907 | Bailey | 144/288 R |
|---|---|---|---|
| 1,602,020 | 10/1926 | Wheeler | 211/49 R |
| 1,765,043 | 6/1930 | White | 211/49 R |
| 1,957,682 | 5/1934 | Turner | 83/29 |
| 2,103,578 | 12/1937 | Ford | 211/49 R |
| 3,146,815 | 9/1964 | Cirese | 269/54.5 |

FOREIGN PATENT DOCUMENTS

| 422587 | 2/1925 | Fed. Rep. of Germany | 47/1 |
|---|---|---|---|
| 874495 | 8/1942 | France | 47/1 |
| 12748 | 7/1960 | United Kingdom | 269/54.5 |

*Primary Examiner*—Steven A. Bratlie

[57] ABSTRACT

A foliage guide for holding in alignment several pieces of stem supported foliage for floral processing such as trimming. The guide comprises a wood base formed with a handle. The base supports two sets of spaced posts which serve as an alignment guide for stems which carry foliage which require processing.

3 Claims, 3 Drawing Figures

U.S. Patent  Nov. 4, 1980  4,231,185
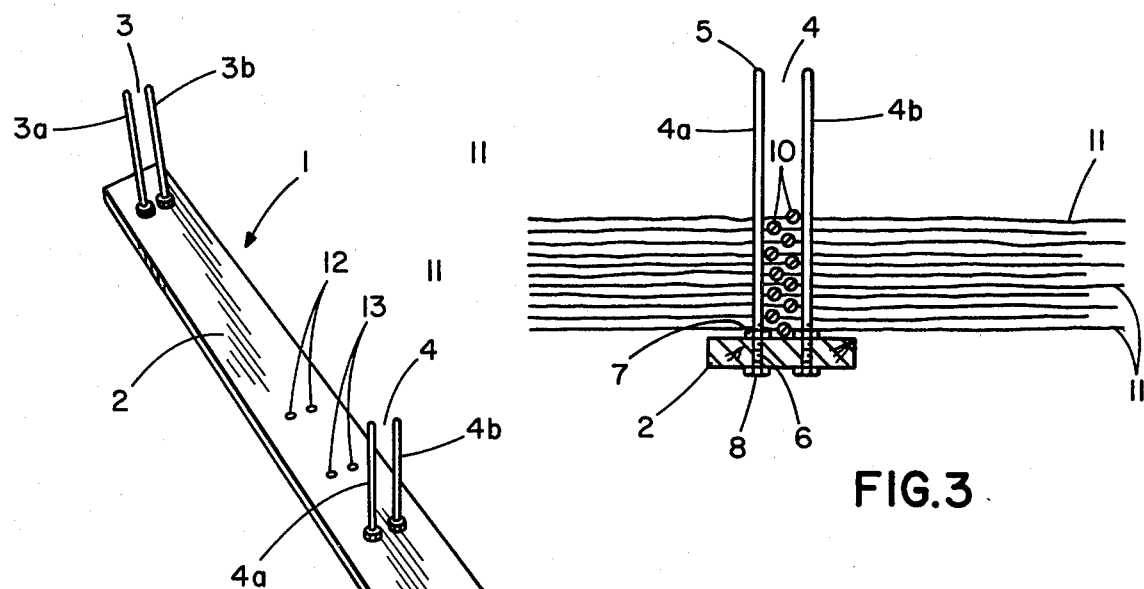
FIG.3
FIG.1
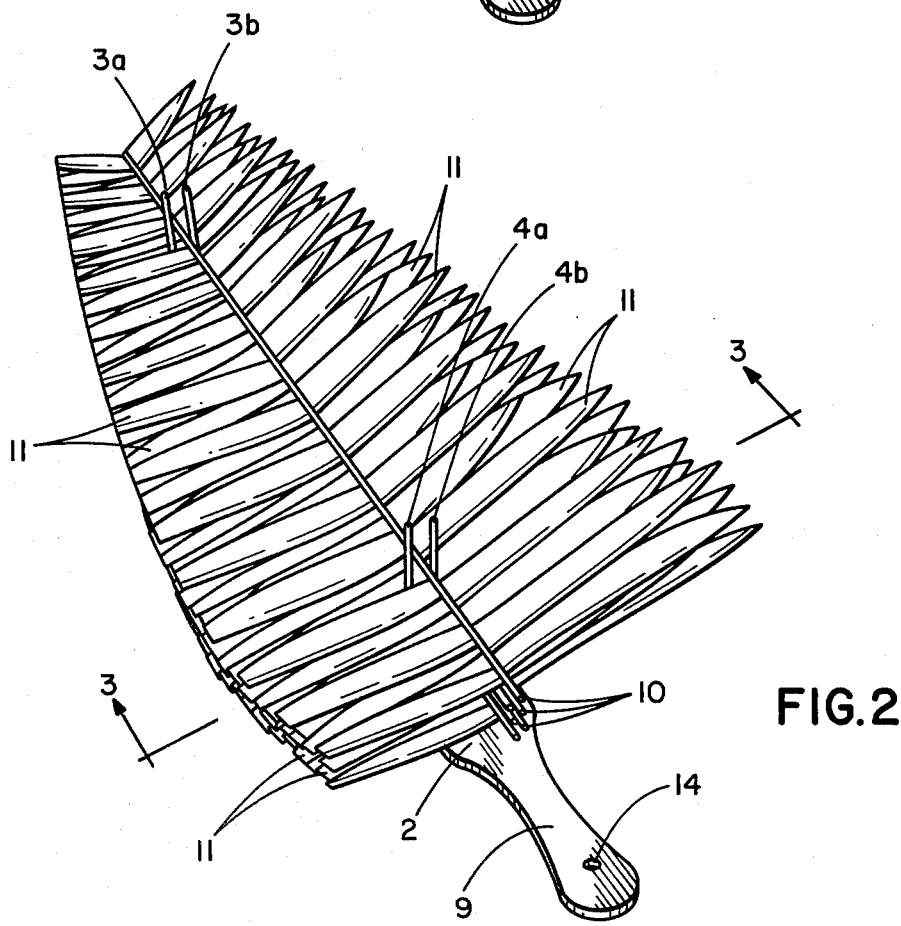
FIG.2

FOLIAGE GUIDE

BACKGROUND OF THE INVENTION

Many floral displays incorporate stem supported foliage. The trimming of foliage is a common practice in the floral industry to enhance the shape of an arrangement or to remove browned and damaged tips. In most instances each piece of stemmed foliage is trimmed individually. This is a time consuming procedure which results in trimmed foliage pieces of varying shapes. This lack of uniformity often detracts from the beauty of the display.

SUMMARY OF THE INVENTION

Accordingly, a principal object of this invention is to improve the uniformity of trimmed foliage and also to reduce the time and effort required to attain that uniformity.

The foregoing object is attained by the improved foliage alignment guide of this invention. The structure of the guide is briefly described in the Abstract. In general, the guide is principally used with foliages having leaves emanating from a center stem, such as palm leaves or ferns. The use of the guide herein described provides saving in time and labor in that as many as twenty-five or more pieces may be cut or trimmed to an identical pattern at the same time.

The several pieces of stemmed foliage are placed in the guide with all of the stems being located between two sets of guide posts. Thereafter, with the several stems being held in closely bundled disposition, the foliage extremities on both sides of the stems, may be uniformly cut in two steps.

DETAILED DESCRIPTION OF THE DRAWINGS

In order that all of the structural features for attaining the objects of this invention may be readily understood, reference is herein made to the drawings wherein:

FIG. 1 is a perspective view of the foliage guide of this invention;

FIG. 2 is a view of the guide carrying a plurality of stems having flat foliage emanating from the stems; and FIG. 3 is a section view taken along line 3—3 of FIG. 2.

DETAILED DESCRIPTION OF THE PREFERRED EMBODIMENT

Referring to the drawings, foliage guide 1 comprises a paddlelike wood base 2 which supports two sets of guide posts 3 and 4. Each of the four guide posts is identical in construction.

The posts 3a,b and 4a,b are preferably formed from rigid metal rod stock. The upper post end 5 is rounded, and the lower end 6 is threaded (see typical post 4a of FIG. 3). A pair of nuts, such as 7 and 8 for post 4a, engage tightly the threaded post sections and fix the posts rigidly on base 2.

The two sets of guide posts 3 and 4 are typically separated from one another substantially the length of that portion of base 2 removed from optional handle 9 formed on the base.

The two sets of guide posts project substantially normally from the upper surface of base 2 to define the corners of a rectangle. Accordingly, the gap or space between posts 3a and 3b is parallel to the gap or space between posts 4a and 4b. This disposition of the two gaps enables a floral worker to place one or more stems 10 of stem supported foliage in the gaps. The individual leaves are woven around the posts. Accordingly, foliage guide 1 serves to align and retain several stems 10 in a closely bundled disposition.

When stems 10 are so restrained, the flat foliage, such as palm leaves 11, of one stem overlays that of another stem. Thereafter, with several stems 10 being held in bundled disposition, the foliage extremities on both sides of stem 10 may be uniformly processed. For example, in FIG. 3 the leaves 11 located on the left of stems 10 have been uniformly trimmed. The leaves located on the right of stems 10 have not been trimmed. In the usual floral display, all leaves 11 will be trimmed to provide a more uniform display.

Base 2 is optionally formed with two (or more) sets of holes 12 and 13. The holes may receive additional set of posts, or alternatively posts 4a and 4b, when short stemmed foliage is to be processed.

Handle 9 facilitates the flat placement of foliage guide 1 on a workbench, and optional handle hole 14 enables the guide to be hung on a hook when not in use.

It should be understood that the above described embodiment is merely illustrative of the principals of the invention, and that changes can be made without departing from the scope of the invention.

What is claimed is:

1. A foliage guide for holding one or more pieces of central stem supported foliage, such as palm leaves or ferns for floral trimming, comprising elongated support means, a first guide having a set of closely spaced elongated rodlike posts fixed to the support means, and a second guide having a set of closely spaced elongated rodlike posts fixed to the support means with both guides being symmetrically disposed along a longitudinal centerline of the support means with the posts of each guide set being fixed closely adjacent the centerline and being substantially removed from the elongated edges of the support means and so spaced to confine substantially all central stems from lateral movement and with both guides being substantially separated from one another to receive and closely guide between the two sets of posts one or more of the stems carrying foliage, with substantial portions of the foliage projecting beyond the support means so that it may be cut away from the support means, and a handle fixed to the support and extending beyond the portion of the support carrying the two sets of guide posts.

2. The combination of claim 1 in which the posts of both guides are elongated metallic elements which project substantially normally from the support means to define the corners of a rectangle, and in which the one or more stems are to lie on the support means between the posts of each guide generally parallel to the long sides of the rectangle with foliage to be cut projecting beyond the support means.

3. The combination of claim 2 in which the longitudinal axis of each post is substantially parallel to the axes of the other posts.

* * * * *